G. E. BISHOP.
AUTOMOBILE INCLOSURE.
APPLICATION FILED OCT. 2, 1919.
1,425,442.
Patented Aug. 8, 1922.
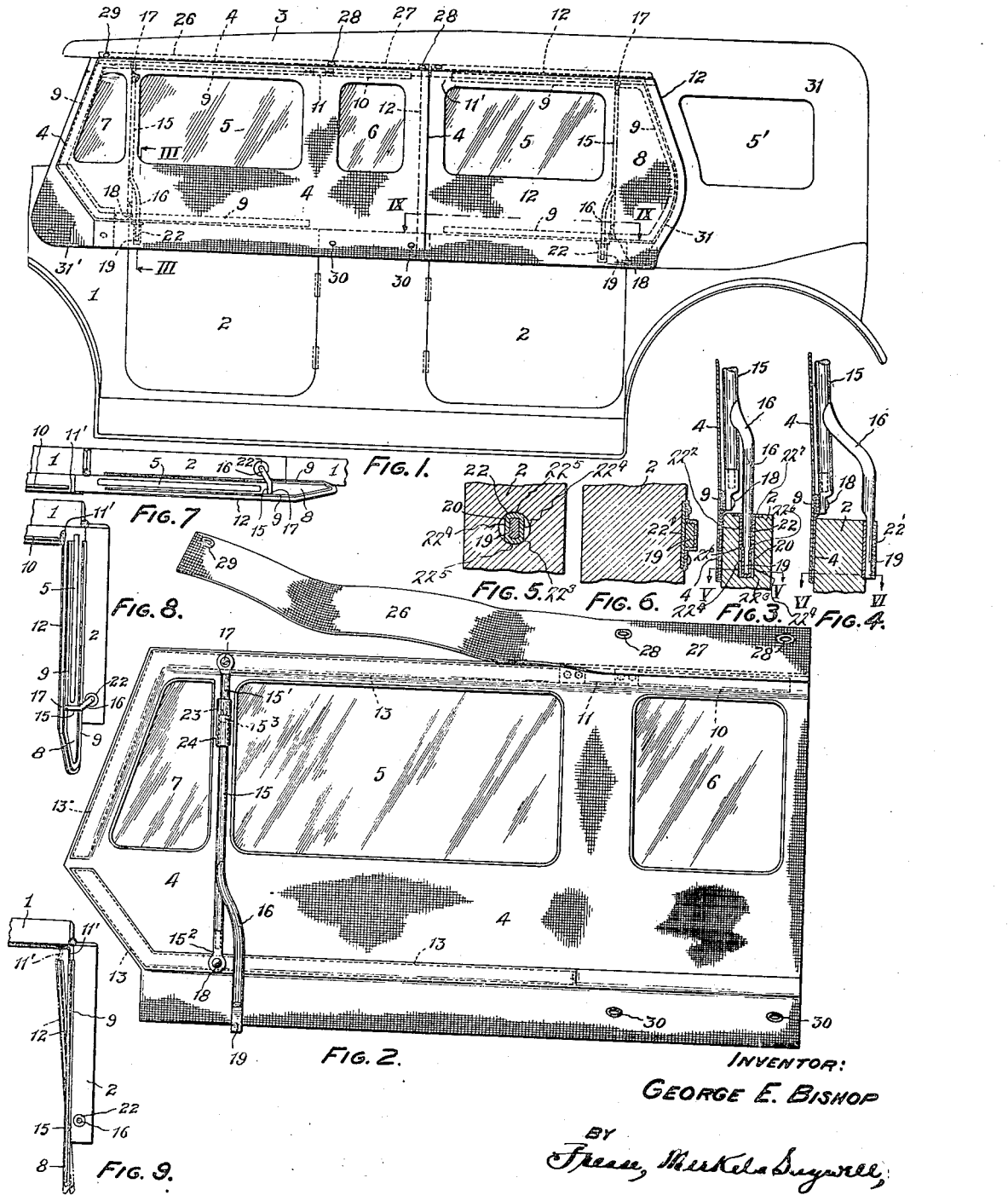
INVENTOR:
GEORGE E. BISHOP
BY
ATTORNEYS.

UNITED STATES PATENT OFFICE.

GEORGE E. BISHOP, OF CLEVELAND, OHIO.

AUTOMOBILE INCLOSURE.

1,425,442.　　　　Specification of Letters Patent.　　Patented Aug. 8, 1922.

Application filed October 2, 1919. Serial No. 327,952.

*To all whom it may concern:*

Be it known that I, GEORGE E. BISHOP, a citizen of the United States, resident of Cleveland, county of Cuyahoga, and State of Ohio, have invented new and useful Improvements in Automobile Inclosures, of which the following is a specification, the principle of the invention being herein explained and the best mode in which I have contemplated applying that principle, so as to distinguish it from other inventions.

My invention relates to side inclosures for automobiles. Particularly, this invention relates to side inclosures comprising the usual fabric provided with glass outlooks and supported by rigid frames upon the automobile doors so that the door portion of the inclosure can be opened and shut with the door. The improvements consist, also, in designing such a rigid frame and related elements so that the overhang of the canopy if such is the construction, can be compensated for as the door opens and closes, obviating strain upon the door, and also allowing for the folding down of a handle portion of the supporting rod flat against the fabric for storage purposes. Furthermore, the strengthening frame can be modified to consist of a plurality of separated portions so that the same can be folded with the fabric for storage.

The annexed drawing and the following description set forth in detail certain means embodying my invention, the disclosed means, however, constituting but one of the various mechanical forms in which the principle of the invention may be employed.

In said annexed drawing:

Figure 1 represents a fragmentary side elevation of an automobile equipped with my improved inclosures;

Figure 2 represents a side elevation of the inner side of one of the inclosures, this view illustrating strengthening members which can be folded with the fabric for storage;

Figure 3 represents, upon an enlarged scale, a transverse vertical section, taken in the plane indicated by the line III—III, Figure 1;

Figure 4 represents a section, similar to that shown in Figure 3, of a construction in which the rigid frame is mounted in a different position upon the automobile door;

Figure 5 represents, upon an enlarged scale, a horizontal section taken in the plane indicated by the line V—V, Figure 3;

Figure 6 represents, upon an enlarged scale, a horizontal section taken in the plane indicated by the line VI—VI, Figure 4;

Figures 7 and 8 are plan views of an automobile door and the side inclosure supported thereon, in the closed and open positions, respectively, of the door, and illustrating the function of a flexible leather or fabric hinge or a double-acting metallic hinge hereinafter fully described; and Figure 9 is a horizontal section taken in the plane indicated by the line IX—IX, Figure 1, and illustrating the function of a double swivel hereinafter fully described.

I have indicated the body of an automobile by the ordinal 1 having the usual entrances comprising door portions and upper heading portions, the doors being indicated by the ordinal 2. A standard canopy construction, which overhangs the body 1, is indicated by the ordinal 3 and the fabric of the front side inclosure by the ordinal 4. The canopy 3 extends out beyond the line of the doors 2 so that it overhangs the doors and body. There are two of my improved inclosures upon a side, in combination with additional fabric sections 31 and 31', in the form of invention illustrated. Various details of these inclosures, as well as the particular construction of additional fabric sections, will vary, according to the type of automobile and the special requirements. In Figure 1, I have illustrated the front inclosure 4 as having a small irregularly shaped front glass outlook 7 in front of the door, and intermediate and rear rectangular outlooks 5 and 6 of suitable size in the door heading and back of the door heading, respectively. I have utilized a comparatively small rear inclosure 12 having only a large rectangular outlook 5 in the door heading, and an irregularly shaped fabric extension 8 back of the door heading. The complete side inclosure also includes the rearmost fabric section 31 having the irregular glass outlook 5', and the forward fabric section 31', in the type of automobile shown.

The inclosure fabric and the contained glass outlooks are supported upon the automobile doors 2 by three-sided rigid frames, Figure 1, comprised of the U-shaped arm 9 and, in the case of the forward inclosure, of the upper rearwardly extended member 10 disposed back of the door heading. The members 9 and 10 are connected by a flexible fabric or leather hinge 11 or a double-acting metal hinge, in the plane of the door hinges. This rigid frame is secured to the fabric in any suitable manner, Figures 3 and 4 showing one way of accomplishing this. The described extension 10 of the upper member of the U-shaped frame, together with the provision of the double-acting hinge, allows for the use of the glass outlooks because of the consequent strength of the frame and allows the effect of any offset of the canopy 3 or lateral extension thereof over the upper rail of the body 1, when the door is opened, to be adjusted.

In Figure 2 I have illustrated a strengthening frame comprised of two disconnected members 13 so that, the glass outlooks being positioned substantially as shown in Figures 1 and 2, the inclosure can be folded for storage when not in use.

In the form of invention illustrated, the rear inclosure 12 consists only of the door and door heading portion and the extended portion 8, the fabric acting as a hinge 11', in the line of the hinges of the rear door 2. The front inclosure 4 laps over the rear inclosure 12, as plainly shown. It would be practicable and sometimes preferable to make the front inclosure the shorter one and attach the extension 10 to the rear inclosure 12.

The inclosure is supported upon the automobile body by means of a cylindrical rod 15 having one socket attachment to the door 2. A socket 20 is formed in the door 2 which receives a bushing 22. The supporting rod 15 is mounted in this bushing 22 so as to be incapable of turning therein but so as to be readily and easily removed therefrom. The bushing 22 is formed from cylindrical tubing and has an upper cylindrical portion $22^2$ with a spun flange $22^7$, and a lower angular portion $22^3$ having oppositely disposed plane side walls $22^4$ adapted closely to register with the milled portion 19 of the rod 15, and curved outwardly extended end walls $22^5$. The mandrel upon which the bushing is formed is shaped so as also to form inner bushing shoulders $22^6$ disposed intermediately the cylindrical upper portion $22^2$ of the bushing and the angular lower portion $22^3$ and upon which shoulders $22^6$ the cylindrical portion of the rod 15 rests. The bushing 22 is driven into the socket formed in the door 2 and the end walls $22^5$ cut through the door material, inasmuch as the over-all dimensions of the bushing 22 in the plane of the extended walls $22^5$ is greater than the diameter of the lower end of the door socket into which the lower portion $22^3$ of the bushing 22 extends. The walls $22^5$ thus form means for securely retaining the bushing 22 in the door, in addition to any close fit that may be formed between the socket 20 and the bushing 22. The extension of the end walls $22^5$ may be carried to a degree where means more pronounced, than the walls $22^5$ shown in Figure 5, are formed for securely retaining the bushing in the door. This may be effected by using over-size tubing to form the bushing, which tubing shall have only an approximate fit with the cylindrical rod 19, the walls $22^5$ being thus further extended to form lateral wings or definite keys for holding the bushing in the door. The results of the described support and mounting are, first, the supporting rod 15 has a cross-section great enough to withstand the heavy stress imposed thereon in the plane of the flange $22^7$; second, a slight clearance between the cylindrical portion $22^2$ of the bushing 22 and the cylindrical portion of the handle 16 is not detrimental, in fact, can be definitely provided so that the rod 15 will not be unduly tight or become wedged in its mounting, the shoulders $22^6$ forming stops limiting the drop of the rod 19 in the socket 22; third, the rod 15 is kept from turning; and, fourth, the milling of the handle 16 to form the flattened portion 19 allows for an accuracy of mounting which could not be secured by rolling or otherwise producing by pressure the flat portion 19. A dependable, but not a wedging, fit is thus definitely secured without any possibility of the turning of the supporting rod 15. In the form shown in Figure 4, the flat socket 22' is utilized and is fastened to the inner lateral surface of the door. The rod 15 at its upper and lower ends is pivotally connected to the upper and lower members of the U-shaped frame by the pins 17 and 18. In order that the handle section 16 of the rod 15 may be folded down close to the fabric for the purpose of storage, I subdivide the rod into sections 15, 15', and $15^2$, the section 15 being swiveled at its upper and lower ends in the short upper and lower sections 15' and $15^2$. In the construction illustrated in Figure 2, which can be folded with the fabric for storage, the section 15' is of less diameter than the section 15, except for an end button portion $15^3$, thus forming a shoulder 23 which supports a sliding sleeve 24, said sleeve having upper and lower walls of different thicknesses to accommodate the rod section 15 and 15', the shoulder consequently formed in the sleeve 24 resting upon the shoulder 23 of the rod 15' to support the sleeve. The sleeve 24 is movable upwardly to collapse the supporting rod, as will be readily understood. This feature is plainly shown, described and claimed in my pending application Serial No. 199,444. When the U-shaped frame is utilized, as shown in Figure 1, the upper swivel takes the place of the sliding sleeve shown in Figure 2. These swivel connections at each end of the supporting rod 15 act with the double hinge 11 to allow the frame to adjust itself with reference to the rigidly held handle section 16, Figure 9, when the doors 2 are opened and closed, thus obviating any strain upon the door attachments. This adjustment is necessary if there is an overhang of the canopy with reference to the automobile body, or if the canopy line falls within the body line. When the doors 2 are closed, the frame and fabric are inclined, as shown in Figures 3, 4 and 7. When the automobile construction is such that the doors 2 drop when they are opened, the swivels described will also equalize this movement and obviate any strain.

I equip my improved inclosure with a valance or bumper feature, forming a part of many of my improved automobile side inclosures, and particularly shown, described and claimed in U. S. Letters Patent No. 1,244,692. This valance consists, briefly, of a fabric portion 26 disposed over the door heading and a portion 27 disposed laterally of the door heading and secured to the adjacent lower fabric portion of the side inclosures. The lateral portion of the valance is secured to the canopy by the fasteners 28 and the door and forward portion by the fastener 29. The upper edge of the fabric 4 closes against the heading portion 26 just above the lower edge of the canopy 3, so that the valance acts as a bumper feature for the door portion of the inclosure, the whole valance supporting the fabric hinge when the door is opened and closed. The lower part of the inclosure may be secured to the automobile body 1 by fasteners, if desired, and, for the purpose of illustration, I have shown in Figure 2 the two fasteners 30 securing the stationary part of the inclosure. However, I have ascertained that the tension provided in my improved inclosure makes a very tight lapping joint so that the necessity for special button fasteners for the door position of the inclosure is entirely eliminated. The arrangement, shown in Figure 2, of the upper fabric stiffener has the effect of carrying up the hinge point of the fabric and, together with the lower stiffener and supporting rod, produces a three-sided frame which assures a smoothly drawn fabric and tight edges.

In addition to the advantages hereinbefore specifically mentioned, I wish to direct particular attention to the fact that I require only one socket attachment in the door for supporting the frame. This makes it possible to very easily attach and detach the inclosure. When two or more sockets are utilized for this purpose, it is necessary to remove the supporting rods in parallel lines; otherwise they bind. Furthermore, rattling of the frame in the socket has been eliminated; and the described construction makes it possible to provide the complete side inclosure.

What I claim is:

1. The combination, in an enclosed vehicle provided with a suitable body having an entrance and a door for said entrance and a canopy, of a construction of the side inclosure thereof comprising a rigid three-sided frame and enclosing material supported by said frame; and means for mounting the frame upon the vehicle door so as to open and shut with the latter, comprising a single supporting rod and a socket attachment therefor secured to the door.

2. The combination, in an enclosed vehicle provided with a suitable body having an entrance and a door for said entrance and a canopy, of a construction of the side inclosure thereof comprising a rigid frame consisting of a pair of horizontally disposed members and an intermediate vertically disposed member and enclosing material supported by said frame; and separate means for mounting the frame upon the vehicle door so as to open and shut with the latter.

3. The combination, in an enclosed vehicle provided with a suitable body having an entrance and a door for said entrance and a canopy, of a construction of the side inclosure thereof comprising a frame having upper and lower side members disposed in the door heading and extending at one end beyond the line of said heading, a discontinuous intermediate member connected to said extended ends of the side members, and enclosing material supported by said frame; and collapsible means for mounting the frame upon the vehicle door so as to open and shut with the latter.

4. The combination, in an enclosed vehicle provided with a suitable body having an entrance and a door for said entrance and a canopy, of a construction of the side inclosure thereof comprising a frame having upper and lower side members disposed in the door heading and extending at one end beyond the line of said heading, a discontinuous laterally-extended intermediate member connected to said extended ends of the side members, and enclosing material supported by said frame; and collapsible means for mounting the frame upon the vehicle door so as to open and shut with the latter, the frame having a swivelling action upon said mounting, so that the frame is capable of changing its relation to the door as the latter opens and shuts.

5. The combination, in an enclosed vehicle provided with a suitable body having an entrance and a door for said entrance and a canopy, of a construction of the side inclosure thereof comprising a rigid three-sided frame having parallel upper and lower side members and an extended intermediate member and enclosing material supported by said frame; and means for mounting the frame upon the vehicle door so as to open and shut with the latter.

6. The combination, in an enclosed vehicle provided with a suitable body having an entrance and a door for said entrance and a canopy, of a construction of the side inclosure thereof comprising a rigid frame having upper and lower side members and a lateral member, said upper side member extending over the heading for the door entrance and beyond the line of the door hinges and being provided with a hinge in the line of said door hinges, and enclosing material supported by said frame; and means for mounting the frame upon the vehicle door so as to open and shut with the latter.

7. The combination, in an enclosed vehicle provided with a suitable body having an entrance and a door for said entrance and a canopy, of a construction of the side inclosure thereof comprising a frame having upper and lower side members and a lateral member, said upper side member extending over the heading for the door entrance and beyond the line of the door hinges and being provided with a double-acting hinge in the line of said door hinges and enclosing material including glass outlooks supported by said frame; and means secured to the vehicle door for mounting the frame thereon so as to open and shut with the door, a part of said mounting having swivel connection with a part secured to the door, said swivelling mounting part being secured to the frame, so that the door-part of the mounting can be turned down flat with the frame when the side inclosure is removed from the door, and so that the frame, when the door is opened and closed, can adjust itself to the automobile body.

8. The combination, in an enclosed vehicle provided with a suitable body having an entrance and a door for said entrance and a canopy, of a construction of the side inclosure thereof comprising a three-sided frame and enclosing material supported by said frame; and means secured to the vehicle door for mounting the frame thereon so as to open and shut with the door, a part of said mounting having swivel connection with a part secured to the door, said swivelling mounting part being secured to the frame, so that the door-part of the mounting can be turned down flat with the frame when the side inclosure is removed from the door.

9. The combination, in an enclosed vehicle provided with a suitable body having an entrance and a door for said entrance and a canopy, of a construction of the side inclosure which is foldable and comprises a three-sided frame of which the intermediate side is comprised of a plurality of disconnected parts, and foldable enclosing material supported by said frame; means secured to the two legs of the three-sided frame for supporting the frame upon the vehicle door so as to open and shut with the latter; and means allowing for the collapsing of said supporting means so that the latter may be folded up with the inclosure in the collapsed condition of the latter.

10. The combination, in an enclosed vehicle provided with a suitable body having an entrance and a door for said entrance and a canopy, of a construction of the side inclosure thereof comprising a frame having upper and lower side members and a lateral member, said upper side member extending over the heading for the door entrance and beyond the line of the door hinges and being provided with a double-acting hinge in the line of said door hinges and enclosing material including glass outlooks supported by said frame; a vertically disposed rod rigidly mounted in said door; and two rod sections pivotally secured to the respective upper and lower frame members, said vertically disposed rod serving as a supporting member for the frame and having swivel connections with said rod sections.

11. The combination, in an enclosed vehicle provided with a suitable body having an entrance and a door for said entrance and a canopy, of a construction of the side inclosure thereof comprising a frame having upper and lower side members and a lateral member, said upper side member extending over the heading for the door entrance and beyond the line of the door hinges and being provided with a double-acting hinge in the line of said door hinges and enclosing material including glass outlooks supported by said frame; a vertically disposed rod rigidly mounted in said door and having an integral downwardly extended member projecting therefrom intermediate the rod ends; and two other rod sections pivotally secured to the respective upper and lower frame members, the upper end of said rod and the lower end of said integral downward extension thereof having swivel connections with said rod sections.

12. The combination, in an enclosed vehicle provided with a suitable body having an entrance and a door for said entrance and a canopy, of a construction of the side inclosure thereof comprising a rigid three-sided frame having parallel upper and lower side members and an extended intermediate member and enclosing material supported by said frame; and means for mounting the frame upon the vehicle door so as to open and shut with the latter, including a single socket attachment in the door.

Signed by me this 24th day of September, 1919.

GEORGE E. BISHOP.